Jan. 2, 1934.  J. V. RESEK  1,942,270
FLUID MIXER
Filed Jan. 28, 1933  3 Sheets-Sheet 1

Inventor
Jules V. Resek.

By Cameron, Kerkam & Sutton.
Attorneys

Jan. 2, 1934.  J. V. RESEK  1,942,270
FLUID MIXER
Filed Jan. 28, 1933  3 Sheets-Sheet 2

Inventor
Jules V. Resek
By Cameron, Kerkam & Sutton
Attorneys

Jan. 2, 1934.   J. V. RESEK   1,942,270
FLUID MIXER
Filed Jan. 28, 1933   3 Sheets-Sheet 3

Inventor
Jules V. Resek
By Cameron, Kerkam & Sutton
Attorneys

Patented Jan. 2, 1934

1,942,270

UNITED STATES PATENT OFFICE 1,942,270

FLUID MIXER

Jules V. Resek, Knoxville, Tenn., assignor to The Fulton Sylphon Company, Knoxville, Tenn., a corporation of Delaware Application January 28, 1933. Serial No. 654,050

31 Claims. (Cl. 236—12)

This invention relates to apparatus for mixing two or more fluids of different temperatures so as to produce a mixture having a substantially constant and predetermined temperature.

It has heretofore been proposed in my earlier joint application, Serial No. 601,624, filed March 28, 1932, to provide a device for mixing two or more fluids of different temperatures wherein each supply line is provided with its individual valve but wherein regulation of the relative rates of supply of the fluids is controlled by a single thermostat which actuates the valve in one of the supp'y lines, the other valve being controlled by the differential pressure between the fluid in the line controlled by the thermostatically operated valve and the fluid in a chamber at the outlet side of said other valve and which chamber is under substantially the same pressure as that existing in the mixing chamber.

It is an object of this invention to provide a fluid mixing device of the type just characterized which is particularly adapted for shower baths and other purposes wherein a relatively small mixer for obtaining a mixture of substantially uniform temperature is desired.

Another object of this invention is to provide a device of the type characterized which is simple and compact in structure so that it is particularly adapted for use where it is necessary or desirable that the mixer occupy only a relatively small space.

Another object of this invention is to provide a device of the type characterized wherein the pressure responsive device is subjected directly to the pressure existing within the mixing chamber.

Another object of this invention is to provide a device of the type characterized which assures that there will be a predetermined minimum differential pressure at the points of delivery from the supply lines into the mixing device.

Another object of this invention is to provide a mixer that is particularly adapted for use in conjunction with shower baths and which assures that no matter what may be the variations in temperature and pressure of the hot fluid the temperature of the mixed fluid cannot rise above a predetermined maximum, said device being also provided with means whereby the temperature of the delivered fluid may be varied below said predetermined maximum.

Another object of the present invention is to provide a device of the type last characterized with novel readily-adjustable means for predetermining the temperature of the mixed fluid.

Another object of this invention is to provide a device of the type last characterized with an improved valve construction which facilitates the maintenance of a substantially uniform temperature of the mixed fluids for fluid flows of small as well as large volume.

Other objects will appear as the description of the invention proceeds.

The invention is capable of receiving a variety of mechanical expressions, three of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings wherein like reference numerals are employed to designate corresponding parts in the respective figures, Fig. 1 is an axial section of an embodiment of the present invention;

Particularly in the case of mixers for shower baths, it is important that notwithstanding fluctuations in the temperature or pressure or rate of flow of the hot and cold fluids to be mixed, the temperature of the mixture shall never rise to such a degree as to introduce the danger of scalding. A mixture that will not exceed a predetermined maximum temperature being provided, means are desirable for predetermining the temperature of the delivered mixture to suit the wishes of the user. The present invention provides a mixer which by reason of the control of the temperature of the mixture from the differential pressures existing in the supply lines and mixing chamber, as well as by a thermostatic control connected to one of the valves, assures that a substantially uniform temperature shall exist in the mixture irrespective of fluctuations in the temperature and pressure of the fluids being mixed, and this temperature being fixed within the range which is safe to prevent scalding, the temperature of the delivered fluid can be further tempered by a further mixture of the cold fluid therewith, the uniformity in the temperature of the mixture thus produced assuring a maintenance of uniform temperature to suit the wishes of the user at the point of delivery.

Figure 1:
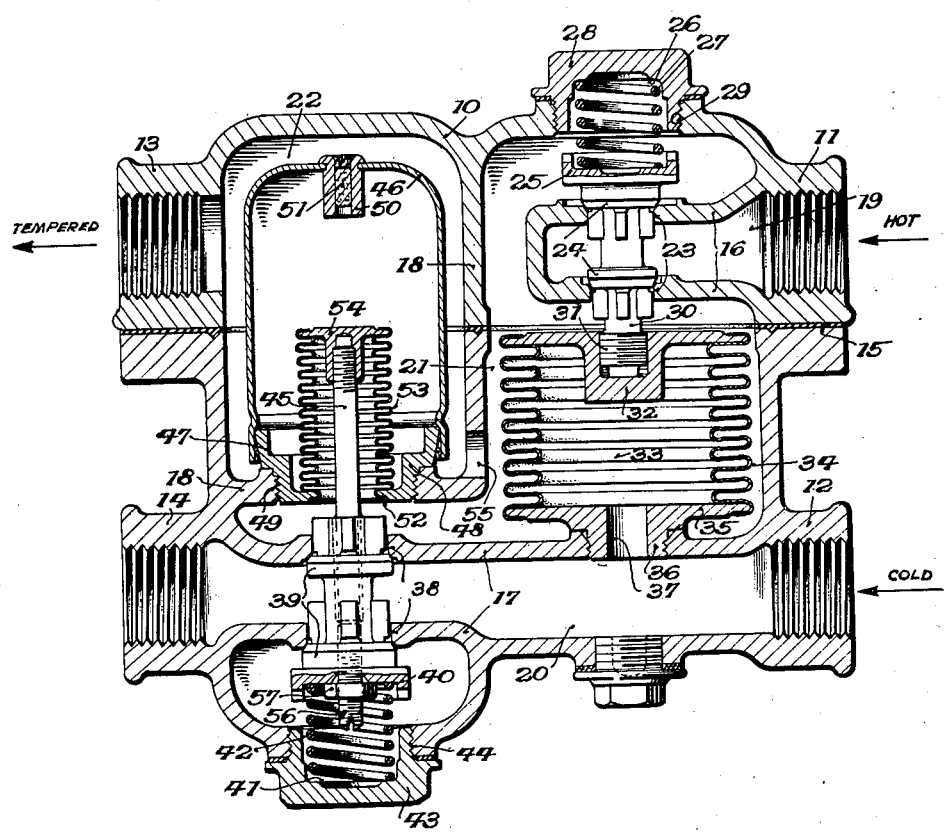

Referring to the embodiment illustrated in Fig. 1, the casing 10 is provided with a suitable connection 11 for communication with any suitable source of hot fluid, as steam or hot water, a suitable connection 12 for communication with any suitable source of cold fluid, as cold water, a suitable connection 13 for communication with any suitable conduit leading to a shower bath or other means for employing the tempered mixture, and a suitable connection 14 for leading the cold fluid through any suitable conduit, when desired, to further temper the mixture. The casing 10 may be conveniently formed in two sections, as illustrated, and the sections suitably connected together in any suitable way, with an interposed gasket 15. The casing 10, which is generally oblong in sections at right angles to the plane of the figure, is interiorly provided with suitable partitions 16, 17 and 18 for dividing the same into a hot fluid inlet chamber 19, a cold fluid inlet chamber 20, a mixing chamber 21, and an outlet chamber 22. The partition 16 is provided with aligned apertures 23 to provide a pair of seats for a double-seated, balanced, reverse-acting valve 24. At one end this valve has suitably mounted thereon a spring seat 25 and interposed between said seat and a seat 26 in the casing wall is a coil spring 27 which normally tends to urge the valve 24 towards its seat. The tension of spring 27 is selected as hereinafter explained. Spring seat 26 is preferably formed on the interior of a screw threaded cap 28 received within a threaded aperture 29 in alignment with the ports 23.

The opposite end of the valve 24 is provided with a stem portion 30 which is suitably connected, as by the threaded connection 31, with the end wall 32 of an expansible and collapsible chamber 33, here shown as formed by a bellows 34 of suitable material attached at one end to the wall 32 and at the other end to a fixed wall 35. End wall 35 has a threaded nipple 36 received within a threaded aperture in the partition 17, also in substantial alignment with the ports 23, and a passage 37 therethrough so that the interior of said chamber 33 is subjected to the pressure existing in the inlet chamber 20 for the cold fluid.

The partitions 17 are also provided with a pair of aligned ports 38 and mounted for cooperation with said ports is a double-seated, balanced, reverse-acting valve member 39. Said valve member is extended at one end to provide a spring seat 40 between which and a spring seat 41 is disposed a coil spring 42 which normally urges the valve 39 towards closed position. Spring seat 41 is preferably formed on the interior of a threaded cap 43 received within a threaded aperture 44 in the casing wall. The opposite end of the valve member 39 is provided with a stem 45 which is suitably connected to a thermostat positioned within the outlet chamber 22.

Said thermostat may be of any suitable construction, but preferably takes the form of a rigid chamber or bulb occupying a major part of said outlet chamber 22 and having a relatively rigid cup-shaped wall 46 which is suitably attached, as by soldering or welding, to a closure member 47 provided with a threaded nipple 48 for reception in a threaded aperture 49 in substantial alignment with the ports 38. The rigid wall 46 is also shown as provided with a filling aperture 50 which, after the chamber within the wall 46 has been charged with any suitable thermosensitive fluid, can be sealed as by plug and solder 51. The thermosensitive fluid is preferably a liquid having a relatively high coefficient of expansion, but if preferred a volatile fluid can be used. Closure member 47 is provided with a central aperture 52 and mounted within said aperture is the end of an expansible and collapsible vessel 53, here shown as a bellows of any suitable material, said bellows at its opposite end being suitably attached to a movable end wall 54 to which the valve stem 45 is attached, as by the threaded connection shown.

The thermostat so provided closes the aperture 49 in the wall 18 and prevents direct passage of the cold water from the ports 38 into the outlet chamber 22. Therefore the cold water flowing through the ports 38 is deflected into the mixing chamber 21 with which the ports 23 also communicate, and which also contains the pressure responsive member 33. From the mixing chamber the fluids, which become intimately intermixed because of the reversal of directions thus provided, flow into the outlet chamber 22 through one or more ports 55, and after flowing around the thermostatic wall 46, whereby further intermixture occurs, can pass out through the connection 13.

Any suitable means may be provided for making an adjustment to predetermine the distance of the valve from its seat for a given temperature at the thermostat. In the embodiment shown in Fig. 1 the valve member 39 is provided with a tubular bore and the stem 45 extends through said bore and is provided at its outer extremity with a threaded portion 56 which cooperates with a threaded portion of said tubular bore. Hence when the cap 43 is removed the valve member 39 may be rotated on the stem 45 to vary the distance between the movable end wall 54 and the seats of said valve, and therefore the amount of valve opening for any given temperature condition. Thereafter the valve member may be locked in position by the lock nut 57. The foregoing therefore provides a means whereby the thermostat may be set to predetermine the maximum temperature to be permitted in the mixture by the thermostat and this temperature will be selected as one which is not dangerous for the conditions of use.

Any suitable shower or other means for using the mixed fluids may be suitably attached to or communicate with the connection 13, and to lower the temperature from that obtained within the chambers 21 and 22 the connection 14 may also communicate with said shower or other means, and any suitable valve or valves be provided for proportioning the respective flows through the connections 13 and 14. If preferred, however, the connection 14 can be plugged up, as described in conjunction with the embodiment of Fig. 2, and the delivery temperature adjusted by means associated with the thermostat.

In operation the cold fluid enters through the chamber 20 and passes through the ports 38 to the extent permitted by the position of the valve member 39, then flowing into the mixing chamber 21. As the interior of the chamber 33 is in open communication with the interior of the chamber 20, the end wall 32 of the chamber 33 is at its inner side subjected to the pressure of the cold fluid. The hot fluid flows into the hot inlet chamber 19 and passes through the ports 23 to the extent permitted by the position of the valve member 24, thus flowing into the mixing chamber 21 to become intimately intermingled with the cold fluid. The unbalanced pressure of the hot medium on the valve member 24 also acts in the same direction as the pressure of the cold medium on the end wall 32, and as the valve member is connected to said end wall, the two pressures are additive. The exterior of the end wall 32 is subjected to the pressure within the chamber 21, and more immediately to the pressure of the hot fluid that has passed through the valve ports 23. Hence this pressure is in opposition to the sum of the pressure just mentioned. The pressure of spring 26 also acts on the movable end wall 32 through the valve member 24 and stem 30, and is additive to the pressure in the mixing chamber. Disregarding the unbalanced pressure acting on the valve 24, which is relatively small, it will therefore be perceived that the pressure of the cold medium on wall 32 is balanced by the pressure in the mixing chamber and the tension of the spring 26 on said wall 32, or expressed otherwise, the tension of the spring 26 is approximately equal to the difference in pressure between the inlet pressure of the cold fluid and the pressure in the mixing chamber or the hot fluid on the outlet side of valve ports 23. By properly selecting the tension of the spring 26 any suitable minimum differential pressure can therefore be maintained between the inlet pressure of the cold fluid and the pressure in the mixing chamber adjacent the point of admission of the hot fluid thereto.

If there is a fluctuation in the pressure of the hot fluid, for example, this is at once transmitted to the pressure within the mixing chamber and to the end wall 32, immediately adjusting said end wall 32 so as to reposition the valve 24 to compensate for the fluctuation in the pressure. Any fluctuation in the temperature of the mixture is effective to cause a contraction or expansion of the fluid within the chamber 46, causing the valve member 39 to approach toward or recede from its seat, thereby varying the admission of cold fluid to the mixing chamber This change in the position of the valve 39 effects the pressure of the cold fluid entering the mixing chamber, and again the variation in the pressure acting on the end wall 32 results in a readjustment of the valve 24 to compensate for the change in position of the valve 39. Hence the temperature of the mixture flowing through the outlet chamber 22 is maintained substantially constant irrespective of fluctuations in the temperature and pressure of the fluids being mixed. The temperature of the mixture can be reduced to suit the wishes of the user by mixing with the fluid delivered through the connection 13 further cold fluid delivered through the connection 14, as heretofore described, and as the temperature at the connection 13 is maintained substantially constant, and there is ordinarily little change in the temperature of the cold fluid, a substantially uniform temperature is thus readily maintained at the point of delivery, such temperature being variable to suit the wishes of the user, but only within the range of temperature lying between the temperature of the cold fluid delivered from outlet 14 and the temperature of the tempered fluid delivered from outlet 13.

Figure 2:
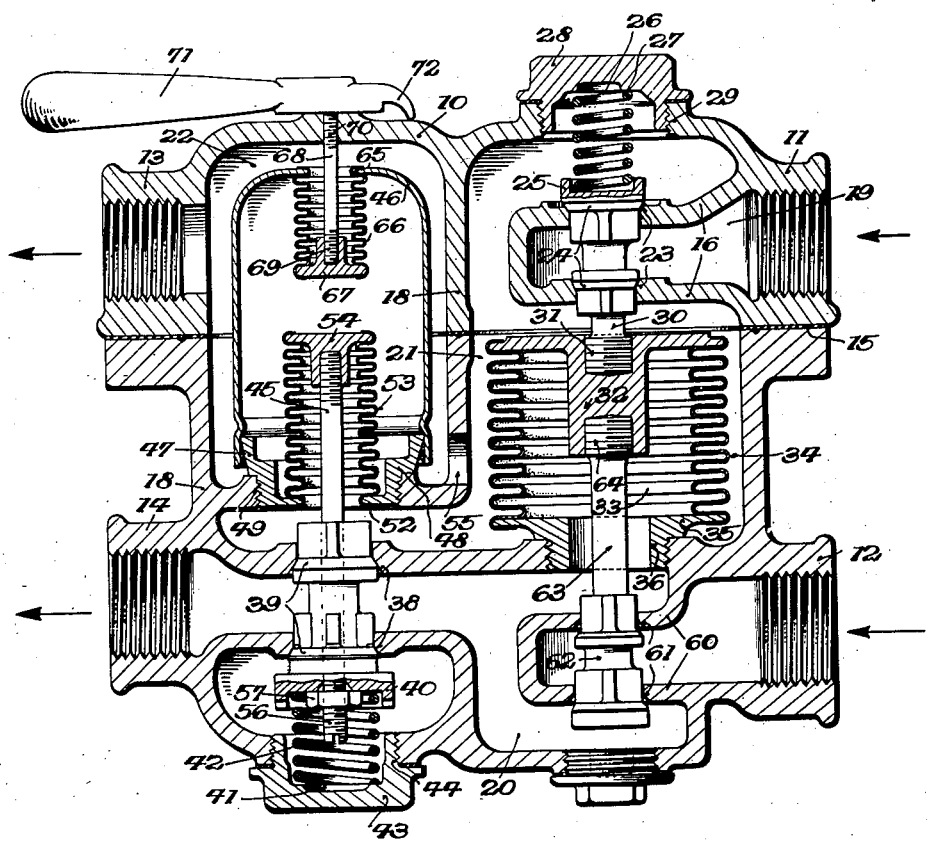
Fig. 2 is an axial section of a second embodiment of the present invention.

If the pressure of the hot medium flowing through the connection 11 may become so low that the difference in pressure between the cold medium and the mixture in the chamber 21 is greater than the tension of the spring 26, the structure as heretofore described may also be provided with means for assuring that a predetermined difference in pressure between the hot and cold mediums at their inlets shall always be maintained. In the embodiment of Fig. 2 the inlet chamber 20 is provided with an additional partition 60 provided with apertures 61 preferably in alignment with the ports 23. Cooperating with said ports 61 is a double-seated, balanced, reverse-acting valve 62 connected by stem 63 to the movable end wall 32 as by the threaded connection 64, the passage 36 being suitably enlarged so that the stem 63 does not unduly restrict the same. Thereby the valve 62 in the inlet of the chamber 20 is connected to the valve 24, so that any adjustment of the valve 24 is accompanied by a corresponding but reverse adjustment of the valve 62 so that a predetermined ratio of pressures is always maintained. It will be noted that the inlet to the chamber 33 is on the outlet side of the ports 61, so that as in the embodiment heretofore described, the interior of the chamber 33 is subjected to the pressure within the chamber 20.

The embodiment of Fig. 2 also illustrates the association with the thermostat of means for adjusting the temperature at which the thermostat responds to open and close the valve 39. As in the embodiment of Fig. 1 the valve is adjustably connected to the end wall 54 of the thermostat by means of the threaded connection 56, whereby the temperature within the chamber 22 can be predetermined. To provide for an adjustment of the thermostat so as to vary the temperature conveniently, means are provided for varying the interior volume or pressure within the bulb or chamber 46, to influence the position of the movable end wall 54 of the flexible wall 53 for admitting a larger quantity of cold fluid to the mixing chamber 21 and thereby maintain a lower temperature within the chamber 22. In this construction the port 14 would ordinarily be plugged.

As shown the end of the bulb 46 is provided with an aperture 65 within which is suitably sealed a flexible member 66, shown as a bellows of any suitable material, to which is sealed a movable end wall 67 that is suitably connected to a stem 68, as by the threaded connection 69. Any suitable means may be provided for moving the stem 68 so as to expand or contract the wall 66, as by the use of dissimilar threads at 69 and 70, and thereby vary the volume or pressure within the bulb 46. As shown, stem 68 is threaded at 70 into the casing wall itself without using a stuffing box, but a stuffing box can be used if desired. Exteriorly of the casing wall stem 68 is provided with a suitable handle 71 for rotating the stem 68, said handle 71 being also shown as being provided with a pointer 72 which may cooperate with suitable indicia on the casing for indicating the adjustment, or the temperature to be obtained at the point of delivery, by operation of said handle 71.

Otherwise the embodiment of Fig. 2 may be, and is shown as, of the some construction as heretofore described in conjunction with Fig. 1.

Figure 3:
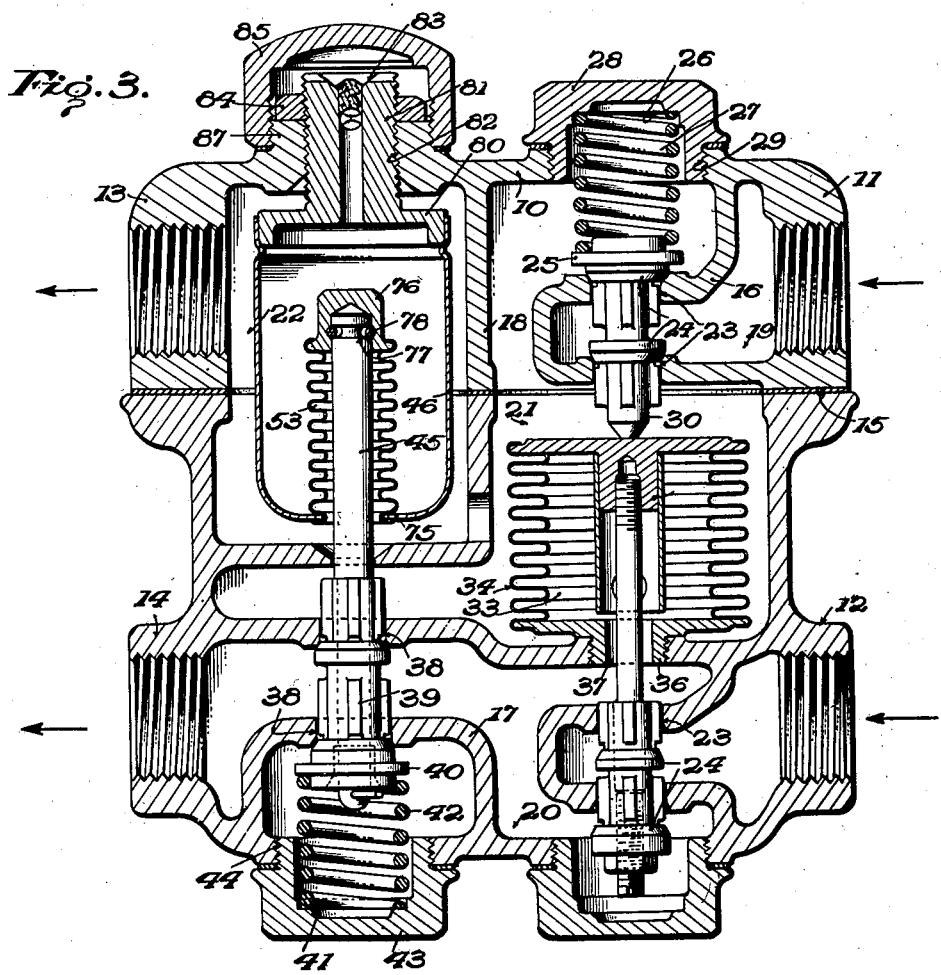
Fig. 3 is an axial section of a third embodiment of the present invention.

A third embodiment of the present invention is shown in Fig. 3 to illustrate a different means by which the adjustment of the thermostat can be effected. Otherwise this embodiment is, or may be, similar to that shown in Fig. 1.

As here shown the adjustment is effected by the bodily displacement of the thermostat to cause the valve member 39 to relatively approach to or recede from its seat or seats. As in the embodiment of Fig. 1 the relatively rigid cup-shaped wall 46 surrounds an expansible and collapsible member or bellows 53 to form a thermostat, and said bellows is suitably attached at its outer end, as by brazing or soldering, to a flange or inwardly directed portion 75 on said wall 46. At its inner end said wall 53 is suitably attached to a cap 76 which in turn is connected to the valve stem 45 by a connection of any suitable character which will permit relative rotation but prevent relative axial displacement. As shown the end of the valve stem 45 is provided with a groove 77 in which is disposed a flexible ring 78 that cooperates with a groove in the inner wall of the recess within said cap 76, whereby the valve stem 45 is locked to said cap 76 against relative axial displacement, but relative rotation between the parts is permitted.

The rigid cup-shaped wall 46 is suitably supported from the casing wall 10 to provide for bodily movement thereof in the direction of the length of the stem 45, so that the position of the valve member 39 with respect to its seats may be varied. As shown, the wall 46 is supported at its outer end by a flange 80 on a threaded stem 81 rotatably mounted in the threaded opening 82 of the casing wall 10. The outer end of the stem 81 may be suitably shaped or formed with a kerf 83 for coaction with a suitable implement for rotating the same, and said threaded stem is shown as locked in its adjusted position by a lock nut 84, while an interiorly threaded cap 85 is shown as mounted on an exteriorly threaded boss 86 to enclose the outer end of the stem. If preferred, however, the supporting stem may be provided with an exterior handle, as at 71 in Fig. 2, so that ready manual adjustment of the thermostat can be effected, in which case a suitable stuffing box may be substituted for the cap 85.

Figure 4:
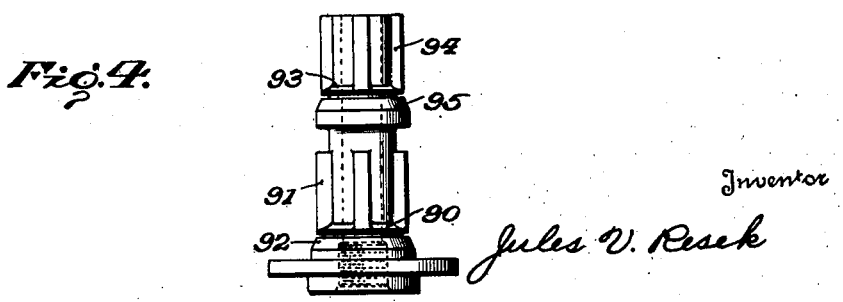
Fig. 4 is an enlarged detail of a preferred form of valve to be used.

In either event it will be perceived that by rotating the supporting stem 81 the thermostat will be moved axially of the valve stem 45 and the valve member 39 will be adjusted with respect to its seats so as to predetermine the valve opening for a given temperature within the chamber containing said thermostat. At the same time the rotation of the supporting stem together with the rigid cup-shaped wall 46 imposes no undue strain upon the flexible wall 53 because of the provision for relative rotation provided at 78, 77. It is also desirable to be able to obtain a relatively large flow of the mixed fluids or cut the flow down to a relatively small amount without producing much variation in the temperature of the mixed fluids. To this end and in conformity with the present invention, the poppet valve is preferably constructed as shown in Fig. 4. As here illustrated, a short skirt 90 is provided between the wings 91 adjacent the valve member 92, so that said valve member tends to act as a piston valve, with a reduction in its sensitiveness, when near its valve seat. A short skirt 93 is also provided between certain of the wings 94 extending from the valve member 95, but in this case the skirt preferably does not extend entirely around said valve member, but is provided in two diametrically opposed spaces between the wings 94. Thereby the sensitiveness of this valve member when adjacent its seat is also reduced. When the valve member is more remote from its seat the skirts 90 and 93 have substantially no effect on the volume of flow between the valve member and its seats.

It will therefore be perceived that a relatively small, simple and compact structure has been provided which is particularly adapted for use as a mixing device for showers and other devices where use of little space by the mixer is either necessary or desirable. The width of the mixer at right angles to the drawings may be substantially that of the diameter of the mixing chamber 21, with allowance for any necessary connecting flanges at 15, so that the mixer as a whole has an oblong or elliptical configuration. Owing to the arrangement of the parts as heretofore described, compactness is attained without loss of the advantages inherent in the principle of operation employed. The pressure responsive member is not only subjected to the pressure within the mixing chamber but actually disposed therein, and at the same time it is disposed closely adjacent the point of delivery from the ports in the hot fluid line, and in direct communication with the cold fluid line, so that the pressure responsive device is highly sensitive to any fluctuations in pressure in the fluid lines or in the mixture. Thereby a particularly sensitive and close control of the temperature of the mixture is obtained. At the same time, the fluid cannot leave the mixing chamber and flow through the connection 13 without coming into intimate contact with the bulb 46 of the thermostat, said bulb being preferably selected of such size that the space therearound assures intimate contact between the fluid flowing through the chamber 22 but without interfering with the proper flow provided by the effective areas at the valve ports in the respective lines. Also, a relatively insensitive valve has been provided.

Means have also been provided whereby a predetermined minimum difference of pressure between the hot and cold fluids is provided at their inlets to the mixer, and means have been provided whereby the maximum temperature of the mixture can be readily set as well as the temperature of the mixture at the point of delivery be readily adjusted within the range below said maximum temperature. The device when used with a shower therefore is an effective anti-scald device, and at the same time provides ready adjustment of the temperature of the mixture to suit the wishes of the user while assuring that a substantially uniform temperature will be maintained at the point of delivery.

While the embodiments of the invention illustrated on the drawings have been described with considerable particularity, it is to be expressly understood that the invention is not limited thereto, as the invention is capable of receiving a variety of mechanical expressions, some of which will now readily suggest themselves to those skilled in the art. As will be apparent, the hot and cold fluid inlets could be transposed, so that the thermostat would directly control the valve in the hot fluid line; also other forms of thermostat, pressure responsive device, adjusting means, etc., may be employed; and changes may be made in the details of construction, arrangement, proportion and shape of parts, and certain features used without other features, without departing from the spirit of the present invention. Reference is therefore to be had to the appended claims for a definition of this invention.

What is claimed is:

1. In a device for mixing fluids, a mixing chamber having an inlet for each of the fluids to be mixed, a thermostatically operated valve for controlling the flow of fluid through one of said inlets in accordance with variations in the temperature of the mixture of fluids, a valve for controlling the flow of fluid through the other of said inlets, and means including a pressure responsive device in said chamber in communication with said first named inlet and connected to said second named valve.

2. In a device for mixing fluids, a mixing chamber having an inlet for each of the fluids to be mixed, a thermostatically operated valve for controlling the flow of fluid through one of said inlets in accordance with variations in the temperature of the mixture of fluids, a valve for controlling the flow of fluid through the other of said inlets, and means including an expansible and collapsible chamber in said mixing chamber and connected to said second named valve, said expansible and collapsible chamber having its interior in communication with said first named inlet.

3. In a device for mixing fluids, a mixing chamber having an inlet for each of the fluids to be mixed, a thermostatically operated valve for controlling the flow of fluid through one of said inlets in accordance with variations in the temperature of the mixture of fluids, a valve for controlling the flow of fluid through the other of said inlets, a pressure responsive device in said chamber in communication with said first named inlet and connected to said second named valve, and resilient means for maintaining a predetermined minimum difference in fluid pressures acting on said pressure responsive device.

4. In a device for mixing fluids, a mixing chamber having an inlet for each of the fluids to be mixed, a thermostatically operated valve for controlling the flow of fluid through one of said inlets in accordance with variations in the temperature of the mixture of fluids, a valve for controlling the flow of fluid through the other or said inlets, means including an expansible and collapsible chamber in said mixing chamber in communication with said first named inlet and connected to said second named valve, and a spring normally urging said last named valve toward closing position.

5. In a device for mixing fluids, a mixing chamber having an inlet for each of the fluids to be mixed, a valve for controlling the flow of fluid through one of said inlets, a valve for controlling the flow of fluid through the other of said inlets, a pressure responsive device subjected to the pressure in said chamber and one of said inlets and connected to one of said valves, and a thermostat within said device connected to the other valve and in axial alignment therewith.

6. In a device for mixing fluids, a mixing chamber having an inlet for each of the fluids to be mixed, a valve for controlling the flow of fluid through one of said inlets, a valve for controlling the flow of fluid through the other of said inlets, a pressure responsive device subjected to the pressure in said chamber and one of said inlets and connected to one of said valves, and a thermostat connected to the other valve and including a rigid chamber within said device and a flexible member within said chamber connected to said valve.

7. In a device for mixing fluids, a mixing chamber having an inlet for each of the fluids to be mixed, a valve for controlling the flow of fluid through one of said inlets, a valve for controlling the flow of fluid through the other of said inlets, a pressure responsive device subjected to the pressure in said chamber and one of said inlets and connected to one of said valves, and a thermostat connected to the other valve and including a relatively rigid chamber, a flexible member connected to said valve and responsive to changes of pressure within said chamber, and means for varying the pressure within said chamber.

8. In a device for mixing fluids, a mixing chamber having an inlet for each of the fluids to be mixed, a valve for controlling the flow of fluid through one of said inlets, a valve for controlling the flow of fluid through the other of said inlets, a pressure responsive device subjected to the pressure in said chamber and one of said inlets and connected to one of said valves, and a thermostat connected to the other valve and including a relatively rigid chamber, a flexible member connected to said valve and responsive to changes of pressure within said chamber, and means for varying the pressure within said chamber including a contractible and expansible member within said chamber and means extending to the exterior of said chamber for expanding and contracting said member.

9. In a device for mixing fluids, a casing, a partition within said casing providing a mixing chamber and an outlet chamber, an inlet for each of the fluids to be mixed, a valve for controlling the flow of fluid through each of said inlets, a pressure responsive device in said mixing chamber and connected to one of said valves, and a thermostat in said outlet chamber connected to the other of said valves.

10. In a device for mixing fluids, a casing, a partition within said casing providing a mixing chamber and an outlet chamber, an inlet for each of the fluids to be mixed, a valve for controlling the flow of fluid through each of said inlets, a pressure responsive device in said mixing chamber and connected to one of said valves, and a thermostat in said outlet chamber connected to the other of said valves, said pressure responsive device including an expansible and collapsible chamber in communication with said thermostatically controlled inlet and having a movable wall connected to said first named valve.

11. In a device for mixing fluids, a casing, a partition within said casing providing a mixing chamber and an outlet chamber, an inlet for each of the fluids to be mixed, a valve for controlling the flow of fluid through each of said inlets, a pressure responsive device in said mixing chamber connected to one of said valves, a thermostat in said outlet chamber connected to the other of said valves, said pressure responsive device including an expansible and collapsible chamber in communication with said thermostatically controlled inlet, and resilient means cooperating with said chamber for maintaining a predetermined minimum difference in the exterior and interior fluid pressures.

12. In a device for mixing fluids, a casing, a partition within said casing providing a mixing chamber and an outlet chamber, an inlet for each of the fluids to be mixed, a valve for controlling the flow of fluid through each of said inlets, a pressure responsive device in said mixing chamber connected to one of said valves, and a thermostat in said outlet chamber connected to the other of said valves, said thermostat including a rigid chamber occupying a major portion of said outlet chamber and a flexible member connected to said second named valve and responsive to changes of pressure within said chamber.

13. In a device for mixing fluids, a casing, a partition within said casing providing a mixing chamber and an outlet chamber, an inlet for each of the fluids to be mixed, a valve for controlling the flow of fluid through each of said inlets, a pressure responsive device in said mixing chamber connected to one of said valves, and a thermostat in said outlet chamber connected to the other of said valves, said thermostat including a rigid chamber occupying a major portion of said outlet chamber, a flexible member connected to said second named valve and responsive to changes of pressure within said chamber, and means for manually varying the pressure within said chamber.

14. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a thermostat in said outlet chamber and connected to one of said valves, and a pressure responsive device subjected to the pressures in said mixing and inlet chambers and connected to the other of said valves.

15. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a thermostat in said outlet chamber and connected to said first named valve, and a pressure responsive device in said mixing chamber and subjected to the pressure in said inlet chamber, said device being connected to said second named valve.

16. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a thermostat in said outlet chamber and connected to said first named valve, a pressure responsive device in said mixing chamber and subjected to the pressure in said inlet chamber, said device being connected to said second named valve, and resilient means cooperating with said pressure responsive device for maintaining a predetermined minimum difference in the fluid pressures acting thereon.

17. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a pressure responsive device communicating with said inlet chamber and disposed in said mixing chamber, said device being connected to said second named valve, and a thermostat disposed in said outlet chamber in alignment with and connected to said first named valve.

18. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a pressure responsive device in said mixing chamber and in communication with said inlet chamber, said device being connected to said second named valve, and a thermostat in said outlet chamber connected to said first named valve, said thermostat including a relatively rigid chamber which occupies a major part of the volume of said outlet chamber and a flexible wall subjected to the pressure within said chamber and connected to said first named valve.

19. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a thermostat in said outlet chamber connected to said first named valve, and an expansible and contractible chamber having a movable wall connected to said second named valve, said chamber having its movable wall exteriorly subjected to the pressure in said mixing chamber and interiorly subjected to the pressure in said inlet chamber.

20. In a device for mixing fluids, an oblong casing provided with a partition extending substantially at right angles to the length of said casing and dividing said casing into a mixing chamber and an outlet chamber, a second partition within said casing extending lengthwise thereof to provide an inlet chamber separated from said mixing chamber, a second inlet to said mixing chamber, a valve controlling the flow of fluid between said inlet chamber and said mixing chamber, a valve controlling said second named inlet, a thermostat in said outlet chamber connected to said first named valve, and an expansible and contractible chamber having a movable wall connected to said second named valve, said chamber having its movable wall exteriorly subjected to the pressure in said mixing chamber and interiorly subjected to the pressure in said inlet chamber, and resilient means cooperating with said chamber and predetermining the minimum difference in pressure between the exterior and interior of said chamber.

21. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device in said mixing chamber in communication with said first named inlet and connected to said second named valve, and means for maintaining a predetermined difference between the pressures of the fluids admitted at said respective inlets.

22. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device in said mixing chamber in communication with said first named inlet and connected to said second named valve, and means for maintaining a predetermined pressure between the fluids admitted at said respective inlets and including a second valve in said first named inlet connected to said pressure responsive device and resilient means cooperating with said pressure responsive device to predetermine the magnitude of the difference in pressure.

23. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device connected to said second named valve, said device being disposed in said mixing chamber and communicating with said first named inlet, and means for adjusting the action of said thermostat including a valve stem of variable length interposed between said thermostat and said first named valve.

24. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device connected to said second named valve, said device being disposed in said mixing chamber and communicating with said first named inlet, and means for varying the thermostatic control of said first named valve including means for varying the pressure within said thermostat.

25. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device connected to said second named valve, said device being disposed in said mixing chamber and communicating with said first named inlet, and means for setting said thermostat whereby to predetermine the maximum temperature of the fluid delivered by said mixing device.

26. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, means including a pressure responsive device connected to said second named valve, said device being disposed in said mixing chamber and communicating with said first named inlet, means for setting said thermostat to determine the maximum temperature of the mixture delivered by said mixing device, and means for tempering said mixture to a desired temperature below said maximum.

27. In a device for mixing fluids, a mixing chamber having an inlet for each of the fluids to be mixed, a valve for controlling the flow of fluid through one of said inlets, a thermostat connected to said valve, a valve for controlling the flow of fluid through the other of said inlets, and means including a pressure responsive device connected to said second named valve, said device being disposed in said mixing chamber and communicating with said first named inlet, means for setting said thermostat to predetermine the maximum temperature of the mixture delivered by said device, and means for adjusting said thermostat to obtain a desired temperature below said maximum temperature.

28. In a mixing device, a mixing chamber having an inlet for cold fluid, a valve for controlling the flow of cold fluid into said mixing chamber, an inlet for heating medium, a valve for controlling the flow of heating medium into said mixing chamber, a thermostat connected to one of said valves and subjected to the temperature of the mixture, and a pressure responsive device in said mixing chamber and subjected to a differential of inlet and mixing chamber pressures said pressure responsive device being connected to the other of said valves.

29. In a device for mixing fluids, a mixing chamber having an inlet for each of the fluids to be mixed, a valve for controlling the flow of fluids through one of said inlets, a thermostat connected to said valve, a valve for controlling the flow of fluid through the other of said inlets, means including a pressure responsive device connected to said second named valve, said device being disposed in said mixing chamber and subjected to the pressure of said first named inlet, and means for moving said thermostat and the valve connected thereto with respect to its valve seat to vary the opening of said valve for a predetermined temperature at said thermostat.

30. In a device for mixing fluids, a mixing chamber having an inlet for each of the fluids to be mixed, a valve for controlling the flow of fluid through one of said inlets, a thermostat connected to said valve and including a relatively rigid cup-shaped wall and a flexible tubular wall attached thereto and contained within the same, said valve having a relatively rotatable but axially immovable connection with the end of said flexible wall, a valve for controlling the flow of fluids through the other of said inlets, means including a pressure responsive device connected to said second named valve and subjected to the pressure of said first named inlet, and means for adjusting the action of said thermostat including a rotatable and axially movable support for said relatively rigid cup-shaped wall.

31. In a device for mixing fluids, a mixing chamber having an inlet for each of the fluids to be mixed, a thermostatically operated valve for controlling the flow of fluid through one of said inlets in accordance with variations in the temperature of the mixture of fluids, a valve for controlling the flow of fluid through the other of said inlets, and means including a pressure responsive device subjected to the pressure of said first named inlet and connected to said second named valve, one or both of said valves including a valve member having wings projecting therefrom and a short skirt projecting from said valve member into the interwing spaces for reducing the sensitiveness of said valve.

JULES V. RESEK.